(12) United States Patent
Yeh

(10) Patent No.: US 9,304,907 B2
(45) Date of Patent: Apr. 5, 2016

(54) DATA MANAGEMENT METHOD, MEMORY CONTROL CIRCUIT UNIT AND MEMORY STORAGE APPARATUS

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 72 days.

(21) Appl. No.: 14/510,130

(22) Filed: Oct. 9, 2014

(65) Prior Publication Data

US 2016/0034388 A1 Feb. 4, 2016

(30) Foreign Application Priority Data

Aug. 4, 2014 (TW) .............................. 103126620 A

(51) Int. Cl.
G06F 12/00 (2006.01)
G06F 12/02 (2006.01)

(52) U.S. Cl.
CPC .... *G06F 12/0246* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| 2012/0210066 A1* | 8/2012 | Joshi | G06F 12/0866 711/118 |
| 2012/0210068 A1* | 8/2012 | Joshi | G06F 9/45558 711/122 |
| 2012/0290798 A1* | 11/2012 | Huang | G06F 3/0608 711/154 |

* cited by examiner

*Primary Examiner* — Kevin Verbrugge
(74) *Attorney, Agent, or Firm* — Jianq Chyun IP Office

(57) ABSTRACT

A data management method is provided, and the method includes: receiving first data and identifying a first address. The method also includes: determining whether the first data is incompressible; and, if the first data is incompressible, determining whether the first address is meeting a requirement of start address. The method further includes: if the first address is not meeting the requirement of start address, storing the padding data starting from the first address, and storing the first data starting from a following address, wherein the following address is meeting the requirement of start address.

24 Claims, 9 Drawing Sheets

DATA MANAGEMENT METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 103126620, filed on Aug. 4, 2014. The entirety of the above-mentioned patent application is hereby incorporated by reference herein and made a part of this specification.

BACKGROUND

1. Technology Field

The present invention is directed to a data management method, especially the data management method for incompressible data, and memory storage apparatus and memory control circuit unit using the same.

2. Description of Related Art

Along with the widespread of digital cameras, cell phones, and MP3 in recently years, the consumers' demand for storage media has increased drastically. Since a rewritable non-volatile memory is characterized by non-volatility of data, low power consumption, small volume, non-mechanical structure, and fast reading and writing speed, the rewritable non-volatile memory is the most adaptable memory to be applied in a portable electronic product, e.g., a notebook computer. A solid state drive (SSD) is a storage apparatus which utilizes a flash memory as its storage medium. Therefore, the flash memory industry has become a very popular part of the electronic industry in recent years.

Recently, because of the pursuit of space utilization of memory, before storing data, the memory apparatus may first test the data and determine whether the data is compressible, and then the memory apparatus store the compressible data after performing a compressing operation to the compressible data. Because some data is incompressible, the compressible data and the incompressible data are stored interleavely and the incompressible data may be divided and be stored in the different physical programming units. In other words, the incompressible data just needed to be stored in one physical programming unit may be divided and stored into the different physical programming units. Therefore, the reading efficiency will decrease when the memory storage apparatus reads such kind of the incompressible data.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a data management method, memory storage apparatus and memory control circuit unit using the same which are capable of effectively improving the efficiency of using the memory space by storing the incompressible data in way of being aligned with the physical programming unit.

According to an exemplary embodiment of the present invention, a data management method for a rewritable non-volatile memory module is provided, wherein the rewritable non-volatile memory module includes a plurality of physical erasing units and a plurality of logical units for mapping to at least a part of the plurality of physical erasing units. Each of the physical erasing units has a plurality of physical programming units, wherein each of the physical programming units at least stores an error checking and correcting frame. The data management method includes: receiving first data, identifying a first physical programming unit among the physical programming units, identifying a first address of the first physical programming unit, and determining whether the first data is incompressible. The data management method also includes: if the first data is incompressible, determining whether the first address of the first physical programming unit is meeting a requirement of start address. The data management method further includes: if the first address of the first physical programming unit is meeting the requirement of start address, planning to store the first data starting from the first address; and if the first address of the first physical programming unit is not meeting the requirement of start address, planning to store padding data starting from the first address and storing the first data starting from a following address, wherein the following address is meeting the requirement of start address.

According to an exemplary embodiment of the present invention, a memory control circuit unit for controlling a rewritable non-volatile memory module is provided. The memory control circuit unit includes: a host interface, a memory interface, and a memory management circuit. The host interface is configured to couple to a host system. The memory interface is configured to couple to the rewritable non-volatile memory module, wherein the rewritable non-volatile memory module has a plurality of physical erasing units and a plurality of logical units for mapping to at least a part of the plurality of physical erasing units. Each of the physical erasing units has a plurality of physical programming units, wherein each of the physical programming units at least stores an error checking and correcting frame. The memory management circuit is configured to couple to the host interface and the memory interface, and configured to configure the plurality of logical units for mapping to at least the part of the plurality of physical erasing units. The memory management circuit is configured to receive first data. The memory management circuit is further configured to identify a first physical programming unit among the plurality of physical programming units, and identify a first address of the first physical programming unit. The memory management circuit is further configured to determine whether the first data is incompressible. If the first data is incompressible, the memory management circuit is configured to determine whether the first address of the first physical programming unit is meeting a requirement of start address. If the first address of the first physical programming unit is meeting a requirement of start address, the memory management circuit is further configured to plan to store the first data starting from the first address. And, if the first address of the first physical programming unit is not meeting a requirement of start address, the memory management circuit is further configured to plan to store padding data starting from the first address, and store the first data starting from a following address, wherein the following address is meeting the requirement of start address.

According to an exemplary embodiment of the present invention, a memory storage apparatus is provided. The memory storage apparatus includes: a connection interface unit, a rewritable non-volatile memory module, and a memory control circuit unit. The connection interface unit is configured to couple to a host system. The rewritable non-volatile memory module includes a plurality of physical erasing units and a plurality of logical units for mapping to at least a part of the plurality of physical erasing units, wherein each of the physical erasing units has a plurality of physical programming units, and each of the physical programming units at least stores an error checking and correcting frame. The memory control circuit unit is configured to couple to the connection interface unit and the rewritable non-volatile memory module, and configured to configure the plurality of logical units for mapping to at least the part of the plurality of physical erasing units. The memory control circuit unit is further configured to receive first data, and identify a first physical programming unit among the plurality of physical programming units. The memory control circuit unit is further configured to identify a first address of the first physical programming unit, and determine whether the first data is incompressible. If the first data is incompressible, the memory control circuit unit is further configured to determine whether the first address of the first physical programming unit is meeting a requirement of start address. And, if the first address of the first physical programming unit is meeting the requirement of start address, the memory control circuit unit is further configured to plan to store the first data starting from the first address. And if the first address of the first physical programming unit is not meeting a requirement of start address, the memory control circuit unit is further configured to plan to store padding data starting from the first address, and store the first data starting from a following address, wherein the following address is meeting the requirement of start address.

Accordingly, the present invention may store the incompressible data in way of being aligned with the data bit area of the physical programming unit such that it may prevent from read more physical programming unit. That is, the present invention may store the incompressible data in way of being aligned with the physical programming unit, for example, the incompressible data of which the size is not larger than the size of one physical programming unit will only be stored in one physical programming unit, wherein the incompressible data will be stored starting from the start address of a programming unit, according to the present invention. Therefore, when reading the incompressible data, there is no need to read redundant physical programming unit(s), and the reading efficiency of the memory storage apparatus will be increased.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
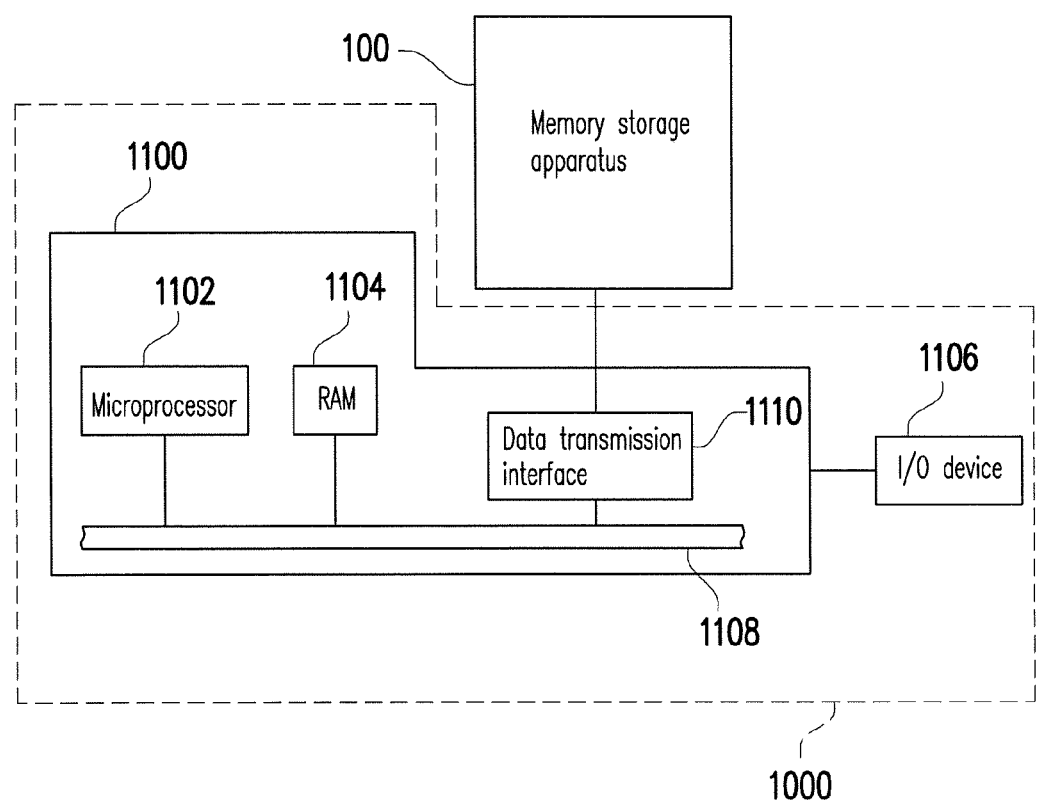
FIG. 1 illustrates a host system and a memory storage apparatus according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

FIG. 1 is a block diagram of a host system and a memory storage apparatus according to an exemplary embodiment of the present invention.

Figure 2:
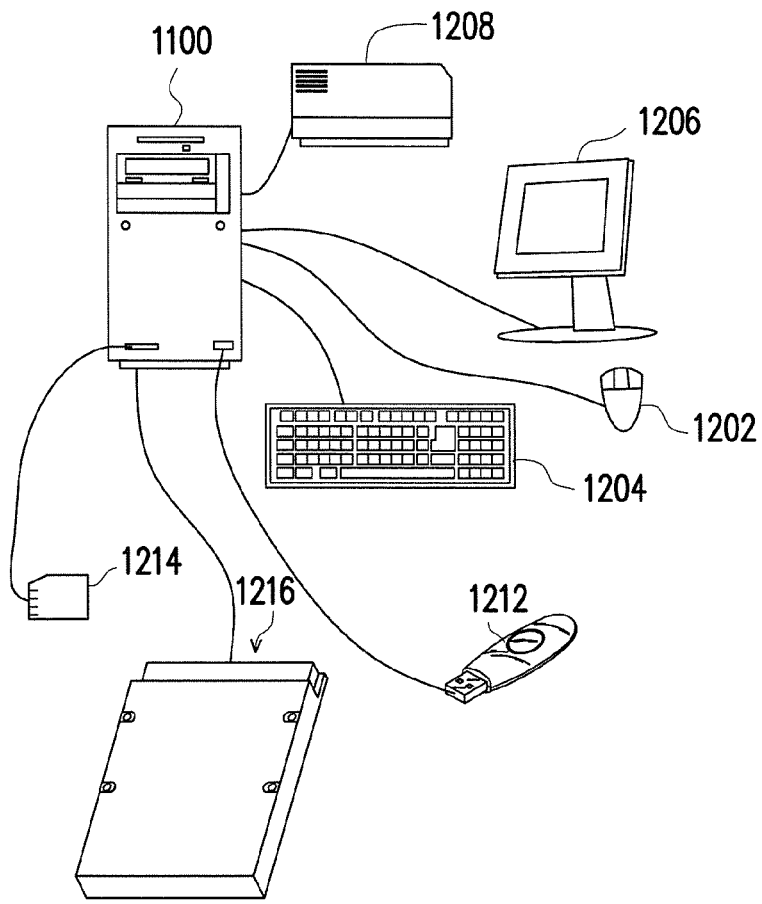
FIG. 2 illustrates a computer, an input/output (I/O) device, and a memory storage apparatus according to the exemplary embodiment.

Referring to FIG. 1, a host system 1000 includes a computer 1100 and an input/output (I/O) device 1106. The computer 1100 includes a microprocessor 1102, a random access memory (RAM) 1104, a system bus 1108, and a data transmission interface 1110. The I/O device 1106 includes a mouse 1202, a keyboard 1204, a display 1206, and a printer 1208, as shown in FIG. 2. It should be understood, the devices depicted in FIG. 2 should not be construed as limitations to the invention, and the I/O device 1106 may further include other devices as well.

In the present exemplary embodiment of the invention, the memory storage apparatus 100 is electrically connected to other devices of the host system 1000 through the data transmission interface 1110. By the operations of the microprocessor 1102, the random access memory (RAM) 1104 and the Input/Output (I/O) device 1106, the data can be written into the memory storage apparatus 100 or can be read from the memory storage apparatus 100. For instance, the memory storage apparatus 100 may be a non-volatile memory storage apparatus, such as a flash drive 1212, a memory card 1214, or a solid state drive (SSD) 1216 as shown in FIG. 2.

Figure 3:
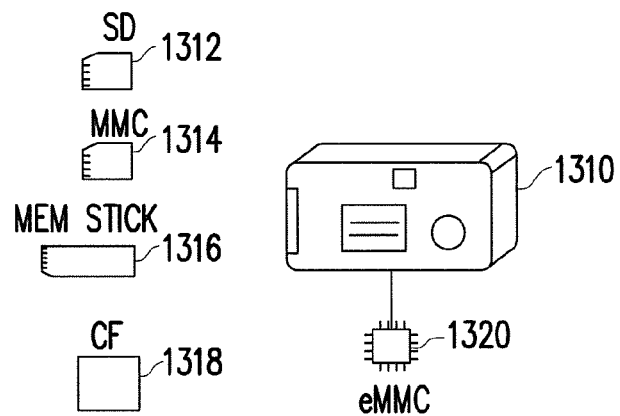
FIG. 3 illustrates a host system and a memory storage apparatus according to the exemplary embodiment.

Generally, the host system 1000 can substantially be any system used together with the memory storage apparatus 100 for storing data. Even though the host system 1000 is described as a computer system in the present exemplary embodiment, the host system 1000 in another exemplary embodiment of the invention may be a digital camera, a video camera, a communication device, an audio player, a video player, and so on. For instance, if the host system is a digital camera (video camera) 1310, the rewritable non-volatile memory storage apparatus is an SD card 1312, an MMC card 1314, a memory stick 1316, a CF card 1318n or an embedded storage apparatus 1320 (as shown in FIG. 3). The embedded storage device 1320 includes an embedded MMC (eMMC). It should be noted that the eMMC is directly electrically connected to a substrate of the host system.

Figure 4:
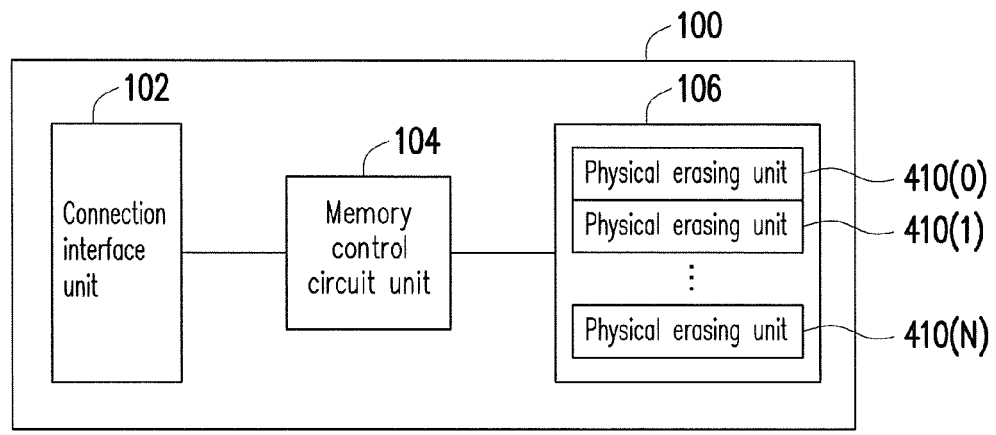
FIG. 4 is a schematic block diagram illustrating the memory storage apparatus depicted in FIG. 1.

FIG. 4 is a schematic block diagram illustrating the memory storage apparatus depicted in FIG. 1.

Referring to FIG. 4, the memory storage apparatus 100 includes a connection interface unit 102, a memory control circuit unit 104, and a rewritable non-volatile memory module 106.

In the present exemplary embodiment, the connection interface unit 102 complies with the serial advanced technology attachment (SATA) standard. However, the invention is not limited thereto, and the connection interface unit 102 may comply with the parallel advanced technology attachment (PATA) standard, the Institute of Electrical and Electronic Engineers (IEEE) 1394 standard, the peripheral component interconnect (PCI) express standard, the universal serial bus (USB) standard, the ultra high speed-I (UHS-I) standard, the ultra high speed-II (UHS-II) standard, the memory sick (MS) standard, the multi media card (MMC) standard, the compact flash (CF) standard, the integrated device electronics (IDE) standard, or other suitable standards. In the present exemplary embodiment, the connection interface unit may be sealed with the memory control circuit unit in a chip or disposed outside of a chip including the memory control circuit unit.

The memory control circuit unit 104 is configured for executing a plurality of logic gates or control instructions which are implemented in a hardware form or in a firmware form and issuing the command sequences to the rewritable non-volatile memory module 106 to perform the operations such as data writing, reading or erasing according to the commands of the host system 1000.

The rewritable non-volatile memory module 106 is electrically connected to the memory control circuit unit 104 and is configured to store the data written by the host system 1000. The rewritable non-volatile memory module 106 includes a plurality of physical erasing units 410(0) to 410(N). For instance, the physical erasing units 410(0) to 410(N) can belong to the same memory die or different memory dies. Each of the physical erasing units includes a plurality of physical programming units, for example, in the present exemplary embodiment of the invention, every physical erasing unit includes 258 physical programming units, wherein the physical programming units which belong to the same physical erasing unit can be written separately but erased altogether at the same time. However, the invention is not limited thereto, and each of the physical erasing units may also be constituted by 64, 256, or any other number of physical programming units.

More specifically, the physical erasing unit is the minimum unit for erasing. Namely, each physical erasing unit contains the least number of memory cells to be erased together. The physical programming unit is the minimum unit for programming. That is, the physical programming unit is the minimum unit for writing data. Each of the physical programming units usually includes a data bit area (DBA) and a spare bit area (SBA). The data bit area includes several physical accessing addresses for storing user data, and the spare bit area is used for storing system data (e.g., control information and error checking and correcting code (ECC)). In the present exemplary embodiment, the size of the data bit area of each physical programming unit is 4096 bytes. The data bit area of each physical programming unit may include 4 physical accessing addresses, and the size of one physical accessing address is 1024 bytes. However, in other exemplary embodiment, the data bit area also may include more or less number of the physical accessing addresses, and amount and size of the physical access address are not limited in the invention. For example, in one exemplary embodiment, a physical erasing unit is a physical block, and a physical programming unit is a physical page or a physical sector, but the invention is not limited thereto.

In the present exemplary embodiment, the rewritable non-volatile memory module 106 is a Multi Level Cell (MLC) NAND flash memory module (i.e., a flash memory module capable of storing two bits of data into one memory cell, which is known as the MLC NAND flash memory module hereinafter). However, the present invention is not limited thereto. The rewritable non-volatile memory module 106 may also be a Single Level Cell (SLC) NAND flash memory module, (i.e., a flash memory module capable of storing one bit of data into one memory cell), a Trinary Level Cell (TLC) NAND flash memory module (i.e., a flash memory module capable of storing three bits of data into one memory cell), other flash memory modules or any memory module having the same features.

Figure 5:
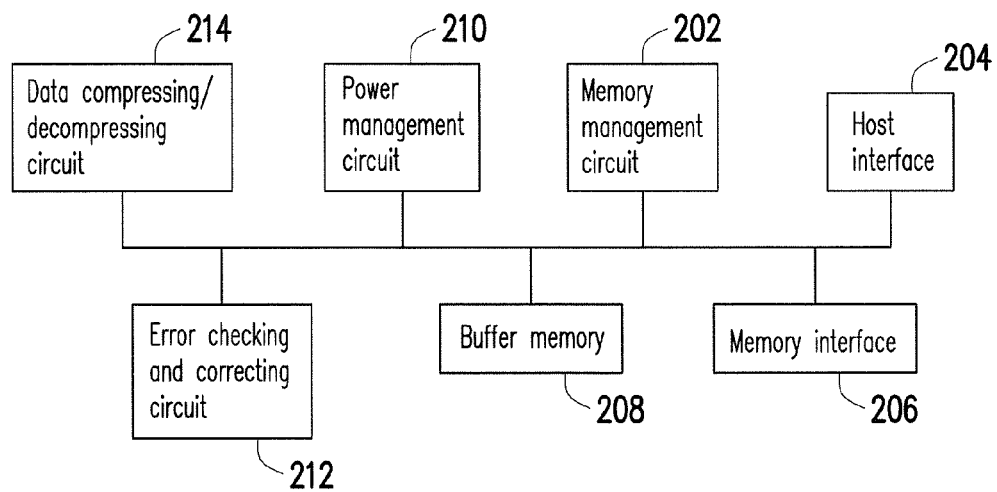
FIG. 5 is a schematic block diagram illustrating a memory control circuit unit according to the exemplary embodiment.

FIG. 5 is a schematic block diagram illustrating a memory control circuit unit according to the exemplary embodiment.

Referring to the FIG. 5, the memory controller 104 includes a memory management circuit 202, a host interface 204, a memory interface 206, a buffer memory 208, a power management circuit 210, an error checking and correcting circuit 212 and data compressing/decompressing circuit 214.

The memory management circuit 202 is configured to control the whole operation of the memory control circuit unit 104. Particularly, the memory management circuit 202 has a plurality of control instructions, and the control instructions are executed to perform a data writing operation, a data reading operation, a data erasing operation, and so on.

In the present exemplary embodiment, the control instructions of the memory management circuit 202 are implemented in a form of a firmware. For example, the memory management circuit 202 includes a microprocessor unit (not shown) and a read-only memory (ROM, not shown), where the control instructions are burned into the read-only memory. During operations of the memory storage apparatus 100, the control instructions are executed by the microprocessor to perform the operations of writing, reading or erasing data.

In another exemplary embodiment of the invention, the control instructions of the memory management circuit 202 may also be stored in a specific block (for example, a system area in a memory module exclusively used for storing system data) of the rewritable non-volatile memory module 106 as a programming code. In addition, the memory management circuit 202 includes a microprocessor unit (not shown), a read-only memory (ROM, not shown) and a random access memory (RAM, not shown). In particular, the ROM has a boot code, and the microprocessor unit first executes the driving code to load the control instructions from the rewritable non-volatile memory module 106 into the RAM of the memory management circuit 202 when the memory control circuit unit 104 is enabled. Thereafter, the control instructions are executed by the microprocessor unit to perform operations of writing, reading or erasing data.

Further, in another exemplary embodiment of the invention, the control instructions of the memory management circuit 202 are implemented in a form of hardware. For example, the memory management circuit 202 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are electrically connected to the micro controller. For example, the memory management circuit 202 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are electrically connected to the microprocessor. The memory cell management circuit is configured for managing the physical erasing unit of the rewritable non-volatile memory module 106; the memory writing circuit is configured for issuing a write command to the rewritable non-volatile memory module 106 in order to write data into the rewritable non-volatile memory module; the memory reading circuit is configured for issuing a read command to the rewritable non-volatile memory module 106 in order to read data from the rewritable non-volatile memory module 106; the memory erasing circuit is configured for issuing an erase command to the rewritable non-volatile memory module 106 in order to erase data from the rewritable non-volatile memory module 106; the data processing circuit is configured for processing both the data to be written into the rewritable non-volatile memory module 106 and the data to be read from the rewritable non-volatile memory module 106.

The host interface 204 is electrically connected to the memory management circuit 202 and configured to receive and identify commands and data sent from the host system 1000. Namely, the commands and data transmitted by the host system 1000 are passed to the memory management circuit 202 through the host interface 204. Namely, the commands and data sent from the host system 1000 are sent to the memory management circuit 202 through the host interface 204. In the present exemplary embodiment, the host interface 204 is compatible to a SATA standard. However, it should be understood that the present invention is not limited thereto, and the host interface 204 may also be compatible with a PATA standard, an IEEE 1394 standard, a PCI Express standard, a USB standard, a UHS-I standard, a UHS-II standard, a MS standard, a MMC standard, a CF standard, an IDE standard, or other suitable standards for data transmission.

The memory interface 206 is electrically connected to the memory management circuit 202 and configured to access the rewritable non-volatile memory module 106. That is, data to be written to the rewritable non-volatile memory module 106 is converted to a format acceptable to the rewritable non-volatile memory module 106 through the memory interface 206.

In an exemplary embodiment of the invention, the memory control circuit unit 104 further includes a buffer memory 208, a power management circuit 210, an error checking and correcting circuit 212 and a data compressing/decompressing circuit 214.

The buffer memory 208 is electrically connected to the memory management circuit 202 and configured to temporarily store data and commands from the host system 1000 or data from the rewritable non-volatile memory module 106. The memory control circuit unit 104 may plan the data, which is from the host system 1000 or the rewritable non-volatile memory module 106, temporarily stored in the buffer memory 208 to let the size of the data be the size of a predetermined unit or the size of the transmission unit, and then the data will be written into the rewritable non-volatile memory module 106 or sent back to the host system 1000.

The power management circuit 210 is electrically connected to the memory management circuit 202 and configured to control the power of the memory storage device 100.

The error checking and correcting circuit 212 is electrically connected to the memory management circuit 202 and configured to perform an error checking and correcting process to ensure the correctness of data. Specifically, when the memory management circuit 202 receives a write command from the host system 1000, the error checking and correcting circuit 212 generates an error checking and correcting code (ECC code) for data corresponding to the write command, and the memory management circuit 202 writes data and the ECC code corresponding to the write command to the rewritable non-volatile memory module 106. Thereafter, when reading data from the rewritable non-volatile memory module 106, the memory management circuit 202 also reads the ECC Code corresponding to such data, and the error checking and correcting circuit 212 performs an error checking and correcting process on the read data based on the read ECC code.

The data compressing/decompressing circuit 214 is coupled to the memory management circuit 202. Herein, the data compressing/decompressing circuit 214 is configured to compress data to be written into the rewritable non-volatile memory module 106 and configured to decompress the data read from the rewritable non-volatile memory module 106. For example, the data compressing/decompressing circuit 214 includes a compressor and a decompressor. The compressor is configured to locate a data redundancy existed in original data, remove the located data redundancy, and encode the rest of necessary data and then output an encoded result (i.e., a compressed data). The decompressor is configured to decode the read compressed data according to given steps and output a decoded result (i.e., a decompressed data). In the present exemplary embodiment, the data compressing/decompressing circuit 214 compresses data by using a lossless compression algorithm, so that the compressed data may be restored later.

Figure 6:
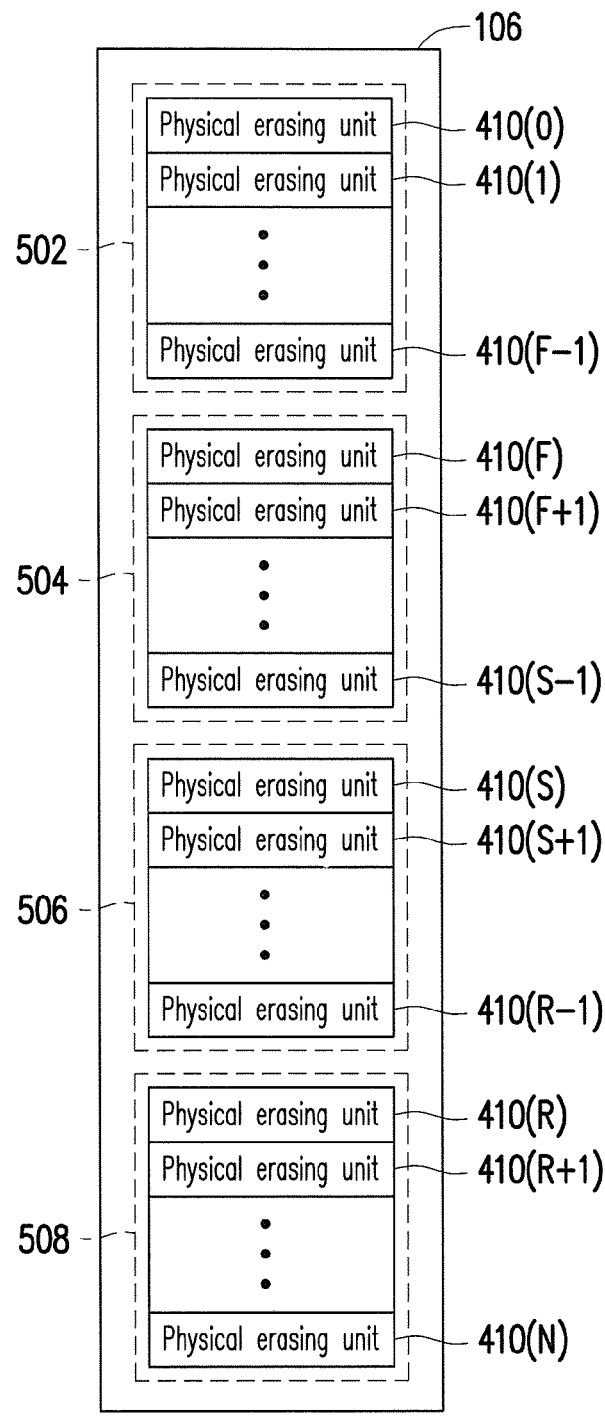
FIG. 6 and FIG. 7 are exemplary diagrams of managing physical erasing units according to the exemplary embodiment.
Figure 7:
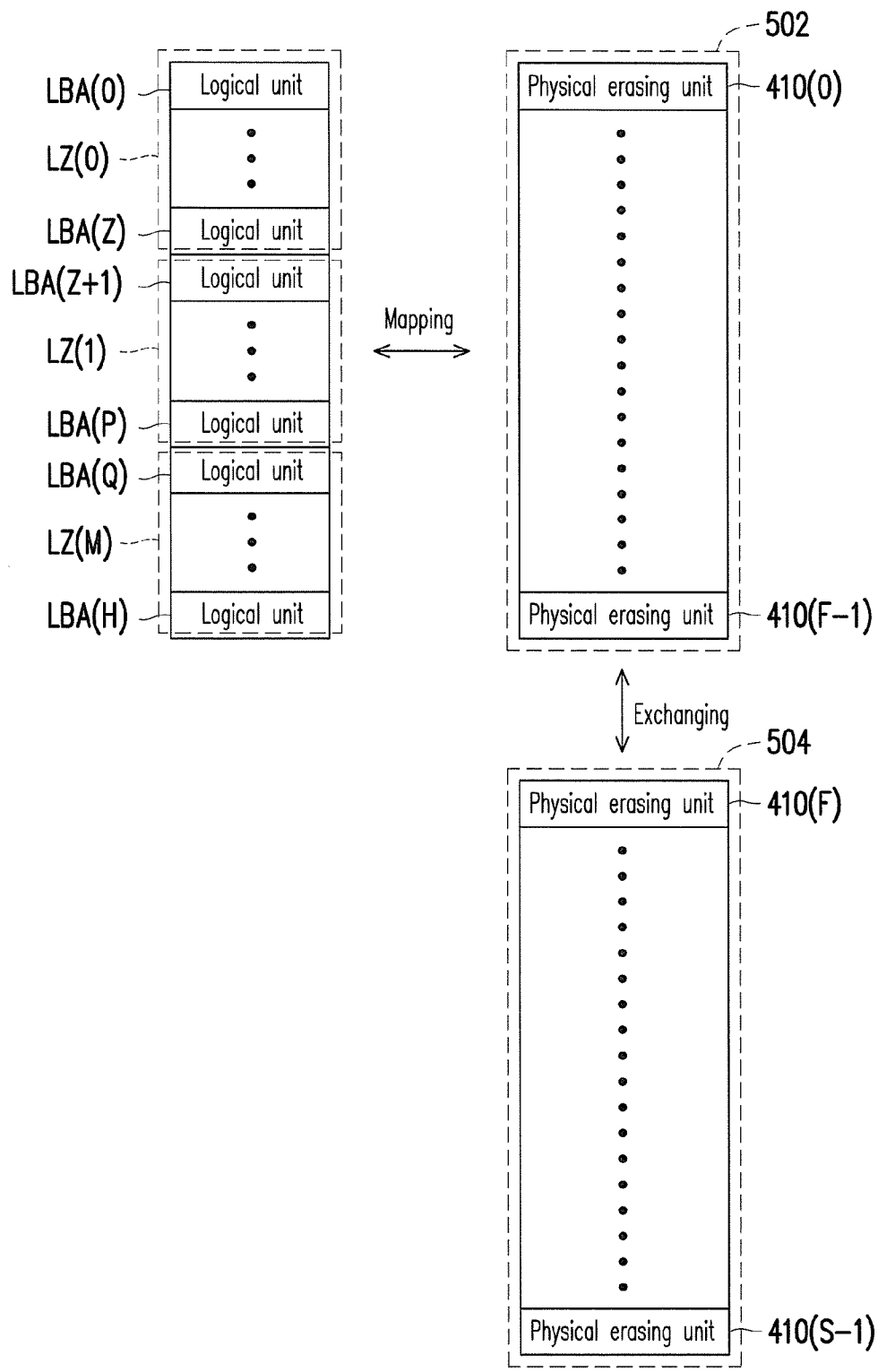

FIG. 6 and FIG. 7 are exemplary diagrams of managing physical erasing units according to the exemplary embodiment.

Referring to FIG. 6, the memory control circuit unit 104 (or the memory management circuit 202) may logically group the physical erasing units 410(0) to 410(N) into a data area 502, a spare area 504, a system area 506 and a replacement area 508.

The physical erasing units logically belonging to the data area 502 and the spare area 504 are configured to store data from the host system 1000. More specifically, the physical erasing units of the data area 502 are regarded as the physical erasing units stored with the data, whereas the physical erasing units of the spare area 504 are configured for exchanging the physical erasing units of the data area 502. In other words, when the write command and the data to be written are received from the host system 1000, the memory management unit 202 may retrieve the physical erasing units from the spare area 504, and write the data into the retrieved physical erasing units for exchanging the physical erasing units in the data area 502.

The physical erasing units logically belonging to the system area 506 are configured to record system data. For example, the system data includes information related to manufacturer and model of the rewritable non-volatile memory module, a number of physical erasing units in the rewritable non-volatile memory module, a number of the physical programming units in each physical erasing unit, and so forth.

The physical erasing units logically belonging to the replacement area 508 are used in a bad physical erasing unit replacement procedure for replacing damaged physical erasing units. More specifically, if available physical erasing units are still present in the replacement area 508 when the physical erasing units of the data area 502 are damaged, the memory management circuit 202 may retrieve the available physical erasing units from the replacement area 508 for replacing the damaged physical erasing units.

In particular, the numbers of the physical erasing units in the data area 502, the spare area 504, the system 506 and the replacement area 508 may be different from one another according to the different memory specifications. In addition, it should be understood that, during operations of the memory storage apparatus 100, grouping relations of the physical erasing units for associating with the data area 502, the spare area 504, the system area 506, and replacement area 508 may be dynamically changed. For example, when the damaged physical erasing units in the spare area 504 are replaced by the physical erasing units in the replacement area 508, the physical erasing units originally from the replacement area 508 are then associated with the spare area 504.

Referring to FIG. 7, the memory control circuit unit 104 (or the memory management circuit 202) may configures logical units LBA(0) to LBA(H) for the physical erasing units of the data area 502, in which each of the logical units includes a plurality of logical sub-units for mapping to the corresponding physical programming units of the physical erasing units. Further, when the host system 1000 intends to write the data into the logical units or update the data stored in the logical units, the memory control circuit unit 104 (or the memory management unit 202) may retrieve one physical erasing units from the spare area 504 for writing the data as an alternately exchange of the physical erasing units of the data area 502. In this exemplary embodiment, the logical sub-units may be logical pages or logical sectors. In the present exemplary embodiment, the logical sub-units are the logical pages each having the size of 4 kilobytes (4K bytes) which is identical to the size of the physical programming unit.

In order to identify which of the physical erasing units is stored with the data of each logical unit, the memory control circuit unit 104 (or the memory management circuit 202) may record the mapping relations between the logical units and the physical erasing units in the present exemplary embodiment. Further, when the host system 1000 intends to access the data in the logical sub-unit, the memory control circuit unit 104 (or the memory management circuit 202) may first confirm the logical unit to which that logical sub-unit belongs, and issue a corresponding command sequence to access the data in the physical erasing units mapped to the logical unit. For instance, in the present exemplary embodiment, the memory control circuit unit 104 (or the memory management circuit 202) may store a logical-to-physical address mapping table into the rewritable non-volatile memory module 106 for recording the physical erasing units mapped to each of the logical units, and the logical-to-physical address mapping table are loaded into the buffer memory 208 for maintenance when the memory control circuit unit 104 (or the memory management circuit 202) intends to the access the data. It should be noted that, the mapping table cannot record the mapping relation for all of the logical units because a capacity of the buffer memory 208 is limited. Therefore, in the present exemplary embodiment, the memory control circuit unit 104 (or the memory management unit 202) groups the logical units LBA(0) to LBA(H) as a plurality of logical zones LZ(0) to LZ(M), and configures one logical-to-physical address mapping table for each of the logical zones. In particular, when the memory control circuit unit 104 (or the memory management unit 202) intends to update the mapping table for one specific logical unit, the logical-to-physical address mapping table of the logical zone to which the logical unit belongs is correspondingly loaded into the buffer memory 208 for updating.

As described above, in the present exemplary embodiment, the rewritable non-volatile memory module 106 of the memory storage apparatus 100 is managed on basis of the physical programming units. Accordingly, when the write command is executed, no matter the current data is to be written into the logical sub-unit of which logical unit, the memory control circuit unit 104 (or the memory management unit 202) may write the data into an active physical programming unit. More specifically, the memory control circuit unit 104 (or the memory management circuit 202) may select an empty physical erasing unit from the spare area 504 to be used as a current physical erasing unit for writing data (i.e., the active physical programming unit). Further, when the current physical erasing unit used is fully written, the memory control circuit unit 104 (or the memory management circuit 202) may select another empty physical erasing unit from the spare area 504 to serve as the current physical erasing unit used to continuously write the data corresponding to the write command from the host system 1000. Particularly, for preventing the physical erasing units in the spare area 504 from being exhausted, when the memory control circuit unit 104 (or memory management circuit 202) selects the physical erasing unit from the spare area 504 and the physical erasing units in the spare area 504 are about to be exhausted, the memory control circuit unit 104 (or memory management circuit 202) may perform a data merge process first to let the data of at least one physical erasing unit in the data area 502 become invalid data, and associate the physical erasing units, in which all stored data is invalid, from the data area 502 to the spare area 504.

In the present exemplary embodiment, as described above, the error checking and correcting circuit 212 of the memory storage apparatus 100 is configured to verify whether the data stored in the rewritable non-volatile memory module 106 is correct. However, when an error correction procedure is executed in either the encoding step or the decoding step, the error checking and correcting circuit 212 needs to clearly know of a data length to be protected, so as to calculate for a correct feature code in order to check a correct location where the error occurs. In the present exemplary embodiment, when the data is received by the memory control circuit unit 104 (or the memory management circuit 202), the memory control circuit unit 104 (or the memory management circuit 202) first divides the data into at least one frame. Thereafter, the error checking and correcting circuit 212 may generate a corresponding error checking and correcting code (ECC) for the data in each frame. Subsequently, the memory control circuit unit 104 (or the memory management circuit 202) may group the data in each frame and the corresponding error checking and correcting code into an error checking and correcting frame, and write the data into the rewritable non-volatile memory module 106 in units of the error checking and correcting frame. Herein, the size of the error checking and correcting frame is divided according to the size of a transmission unit, and the size of the transmission is decided according to a specification (e.g., bits to be protected per transmission unit) of the rewritable non-volatile memory module 106. For example, 24 bits are protected when the transmission unit is 4K bytes. When the error checking and correcting frame is set to 4K bytes, the memory control circuit unit 104 (or the memory management circuit 202) may divide the data into a frame that is less than 4K bytes per unit. The error checking and correcting circuit 212 may execute an error correcting encoding for the data in each frame, so that a total of size of the generated error checking and correcting code and each frame is 4K bytes. In another exemplary embodiment, each frame is directly set to 4K bytes, and the error checking and correcting code corresponding to the data of each frame is grouped with the 4K bytes frame altogether into an error checking and correcting frame. Or, the error checking and correcting code corresponding to the data of each frame is stored in the spare bit area corresponding to each frame, and the data of each frame is protected by the error checking and correcting circuit 212.

Nevertheless, it should be understood that the invention is not limited thereto. In another exemplary embodiment, the size of the error checking and correcting frame may also be 1K bytes, 2K bytes or 3K byte and so forth. It is worth mentioning that, each of the physical programming units stores at least one error checking and correcting frame, such that the data stored in the physical programming units may be protected by the error checking and correcting circuit 212 in units of the size the error checking and correcting frame.

For example, in the present exemplary embodiment, a maximum protection that the error checking and correcting circuit 212 can provide is 24 bits. Accordingly, when the number of error bits in the error checking and correcting frame is greater than 24 (e.g., 25), the error checking and correcting circuit 212 is unable to correct error data in the error checking and correcting frame. As a result, the data stored in the error checking and correcting frame cannot be read normally and becomes damaged data that cannot be recovered. In this case, it also indicates that the physical erasing unit having the damaged data is already unusable due to aged deterioration. Therefore, the memory control circuit unit 104 (or the memory management circuit 202) may mark the physical programming unit having the number of the error bits exceeding the maximum protection of the error checking and correcting circuit 212 as a bad physical programming unit, and record the same in a bad physical programming unit distribution table.

In the present exemplary embodiment, the memory control circuit unit 104 (or the memory management circuit 202) may use an aligning mode to store incompressible data. Hereinafter, there are few exemplary embodiments accompanied with drawings are described in detail of the method of using the aligning mode to store the incompressible data into the physical programming units. It should be mentioned, the determination steps/operations in the following exemplary embodiments are optional and for description of the concept of the invention, and the invention is not to be limited thereto.

Figure 8B:
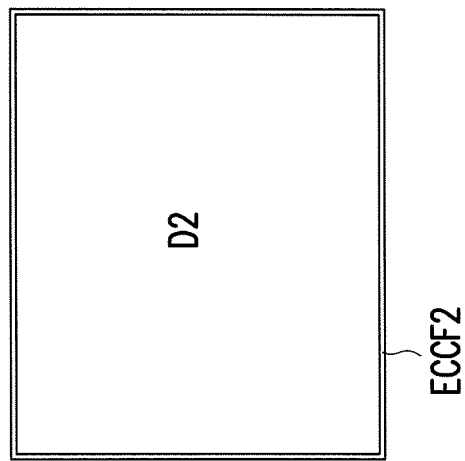
FIGS. 8A to 8C are diagrams illustrating an example of storing incompressible data into a physical programming unit according to the exemplary embodiment.
Figure 8A:
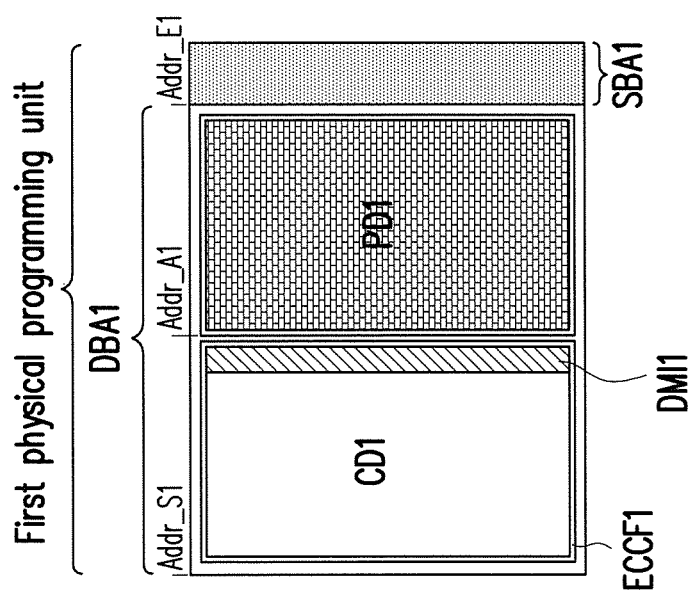
Figure 8C:
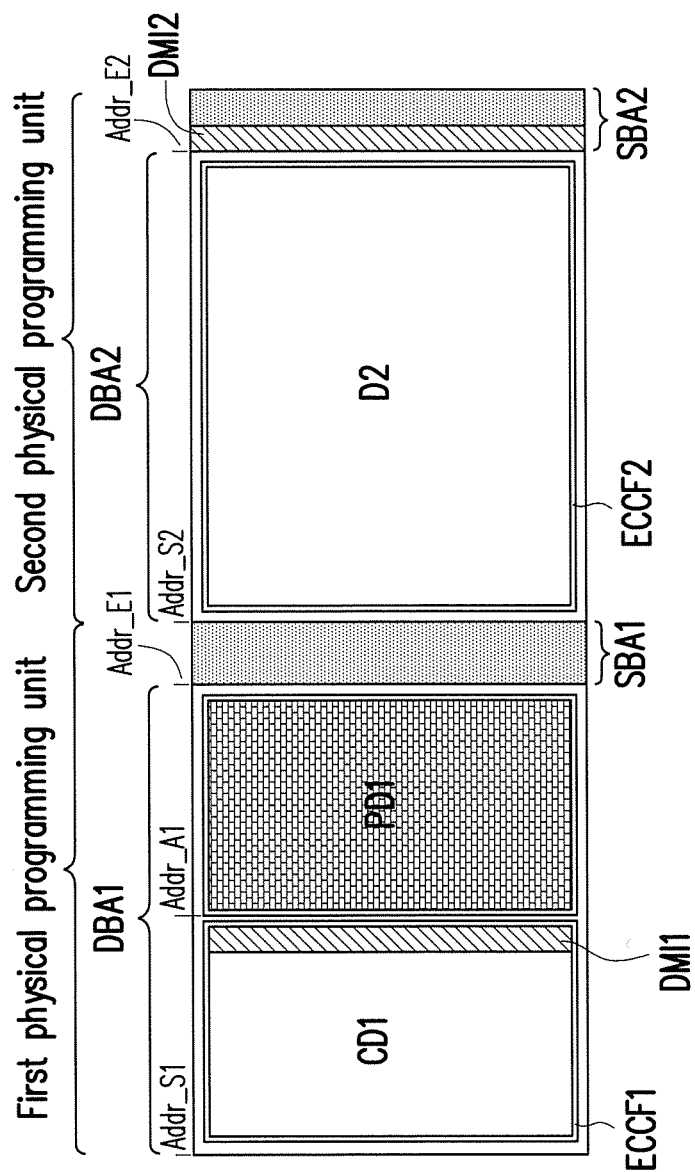

FIGS. 8A to 8C are diagrams illustrating an example of storing incompressible data into a physical programming unit according to the exemplary embodiment.

In the present exemplary embodiment, the planning of the physical addresses of a physical erasing unit is, according to the order of the data bit areas of the physical programming units, sequentially using the sequent data bit areas in units of a byte. For example, referring to FIG. 8A and FIG. 8B, the first one physical programming unit of the first physical erasing unit is the first physical programming unit, and the physical addresses of the first data bit area DBA1 of the first physical programming unit are planned from the first start physical address Addr_S1, the value of which is 0, to the first end physical address Addr_E1, the value of which is 4095, and so on. Similarly, Referring to FIG. 8A, the distribution of the physical addresses of the second data bit area DBA2 of the second physical programming unit, which is continued the first physical programming unit, is from the second start physical address Addr_S2, the value of which is 4096, to the second end physical address Addr_E2, the value of which is 8191.

Referring to FIG. 8A and FIG. 8B, for example, the first physical programming unit includes the first data bit area DBA1 having the size of 4096 bytes and the first spare bit area SBA1. The first data bit area DBA1 stores the first error checking and correcting frame ECCF1, wherein the first error checking and correcting frame ECCF1 is grouped with the first compressed data CD1 and the first data management information DMI1, and the size of the first error checking and correcting frame ECCF1 is 2048 bytes. Therefore the size of remained available space of the first data bit area DBA1 is 2048 bytes.

In the present exemplary embodiment, after receiving a second write command and the second data D2 corresponding to the second write command and having the size of 4096 bytes, the memory control circuit unit 104 (or the memory management circuit 202) may first determine whether the second data D2 is compressible. If the second data D2 is incompressible, the memory control circuit unit 104 (or the memory management circuit 202) may use the aligning mode to store the second data D2, identify the first available space start address (also referred to the first address) Addr_A1, and determine whether the first available space start address Addr_A1 is meeting the requirement of start address. The "available space start address" means the address from which the available space in a physical programming unit starts, and the first available space start address Addr_A1 means the address from which the available space in the first physical programming unit starts (as illustrated in FIG. 8A-8C).

In the present exemplary embodiment, the foregoing requirement of start address, for example, is a multiple of the error checking and correcting frame length or a sum of a multiple of the error checking and correcting frame length and a fixed value, wherein the size of the error checking and correcting frame length is 4096 bytes. In the followed exemplary embodiment, for ease of describing the concept of the invention, the requirement of start address is set as an integer multiple of the error checking and correcting frame length, for example, the foregoing determination of determining whether the first available space start address Addr_A1 is meeting the requirement of start address may be set as determining whether the first available space start address Addr_A1 is an integer multiple of the error checking and correcting frame length. It should be mentioned, the example of setting the requirement of start address as described above is only for describing the invention, and the invention is not be limited thereto.

Referring to FIG. 8A, for example, the requirement of start address is set as an integer multiple of the error checking and correcting frame length. Since the first error checking and correcting frame ECCF1 having the size of 2048 bytes is stored starting from the first start physical address Addr_S1, the first available space start address Addr_A1 is 2048. In this example, the first available space start address Addr_A1, the value of which is 2048, is not an integer multiple of the error checking and correcting frame length (4096), namely, the first available space start address Addr_A1 is not meeting the requirement of start address. Therefore the memory control circuit unit 104 (or the memory management circuit 202) may plan to add one padding data (hereinafter, refers to the first padding data PD1) starting from the first available space start address Addr_A1 to the first end physical address Addr_E1, and store the second data D2 starting from a following address, wherein the padding data may be dummy data.

Referring to FIG. 8C, for example, the memory control circuit unit 104 (or the memory management circuit 202) may identify a next physical address, the value of which is an integer multiple of the error checking and correcting frame length (4096), after the first available space start address Addr_A1, and set this physical address as the following address. And then, the memory control circuit unit 104 (or the memory management circuit 202) may store the first padding data PD1 starting from the first available space start address Addr_A1 to a physical address before the foregoing following address. As the foregoing example, because the next physical address, of which the value is an integer multiple of the error checking and correcting frame length, after the first available space start address Addr_A1 (namely, the physical address of which the value is 2048) is the second start physical address Addr_S2 (namely, the value of this second physical address is 4096) of the second physical programming unit, the memory control circuit unit 104 (or the memory management circuit 202) may set the following address to be the second start physical address Addr_S2. Because the physical address, which is capable of storing data, before the second start physical address Addr_S2 is the first end physical address Addr_E1 of the first physical programming unit, the memory control circuit unit 104 (or the memory management circuit 202) may store the first padding data PD1 between the first available space start address Addr_A1 and the first end physical address Addr_E1. And then, the memory control circuit unit 104 (or the memory management circuit 202) may plan to store the second data D2 starting from the following address (namely, the second start physical address Addr_S2).

It should be mentioned, in another exemplary embodiment, if the first available space start address Addr_A1 is not an integer multiple of the error checking and correcting frame length, the memory control circuit unit 104 (or the memory management circuit 202) may also, according to the size of the available space between the first available space start address Addr_A1 and the following address, plan to store valid data smaller than the available space into the available space, and then store the first padding data PD1 to fill the remained available space after storing the valid data.

It should be mentioned, in another exemplary embodiment, if the first available space start address Addr_A1 is not an integer multiple of the error checking and correcting frame length, after setting the following address, of which the value is an integer multiple of the error checking and correcting frame length, the memory control circuit unit 104 (or the memory management circuit 202) may also first determine whether the size of the second data D2 is larger than a predetermined value. If the size of the second data D2 is larger than the predetermined value, the memory control circuit unit 104 (or the memory management circuit 202) may then plan to store the first padding data PD1 starting from the first available space start address Addr_A1, and store the second data D2 starting from the following address. If the size of the second data D2 is not larger than the predetermined value, the memory control circuit unit 104 (or the memory management circuit 202) may plan to store a first part of the second data D2 starting from the first available space start address Addr_A1, and store a second part of the second data D2 starting from the following address.

It should be mentioned, in another exemplary embodiment, if the first available space start address Addr_A1 is not an integer multiple of the error checking and correcting frame length, after setting the following address, of which the value is an integer multiple of the error checking and correcting frame length, the memory control circuit unit 104 (or the memory management circuit 202) may first determine whether the total length of incompressible data which is planned to store continuously after the second data D2 is larger than a predetermined length. If the total length of incompressible data which is planned to store continuously after the second data D2 is larger than the predetermined length, the memory control circuit unit 104 (or the memory management circuit 202) may plan to store the first padding data PD1 starting from the first available space start address Addr_A1, and store the second data D2 starting from the following address, wherein the following address is an integer multiple of the error checking and correcting frame length. If the total length of incompressible data which is planned to store continuously after the second data D2 is not larger than the predetermined length, the memory control circuit unit 104 (or the memory management circuit 202) may plan to store a first part of the second data D2 starting from the first available space start address Addr_A1, and store a second part of the second data D2 starting from the following address. That is, the memory control circuit unit 104 (or the memory management circuit 202) may determine that if an amount of the incompressible data, which is continuously received and about to be stored, is larger than a predetermined amount, or if the total data length of the received incompressible data is larger than a predetermined length, the memory control circuit unit 104 (or the memory management circuit 202) may then perform the padding operation. Therefore, it may prevent the problem of efficiency decrease because of that receiving many compressible data and incompressible data interleavely and then performing the padding operation.

Figure 9:
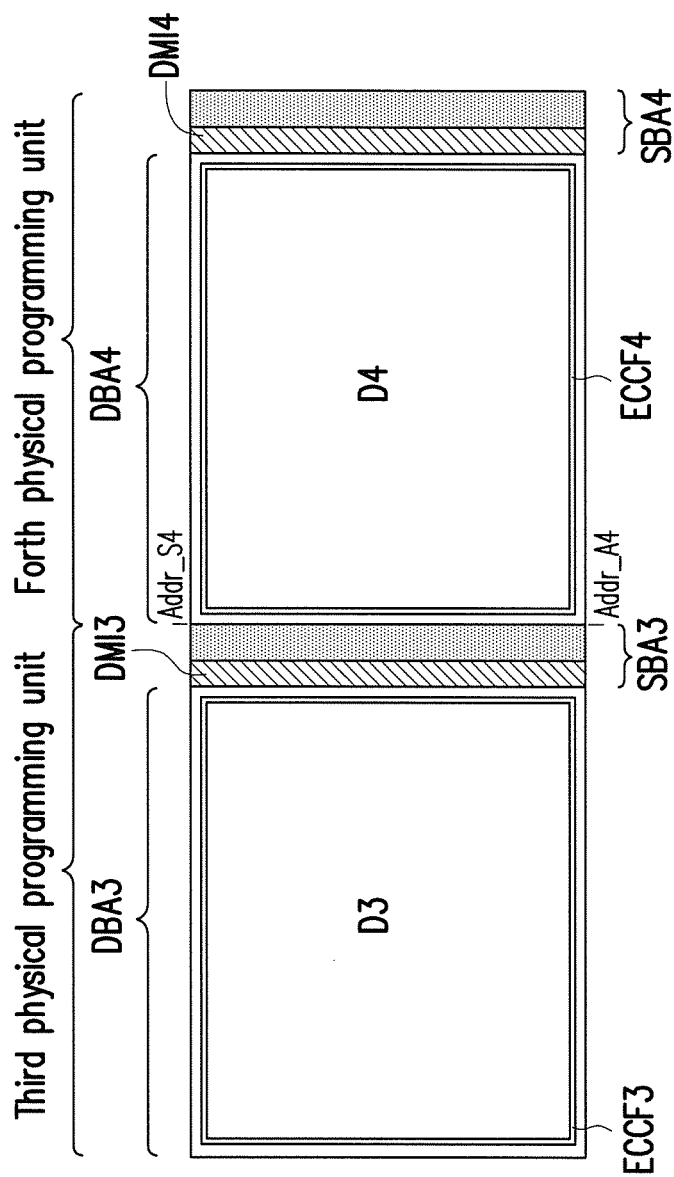
FIG. 9 is a diagram illustrating an example of storing incompressible data into a physical programming unit according to another exemplary embodiment.

FIG. 9 is a diagram illustrating an example of storing incompressible data into a physical programming unit according to another exemplary embodiment.

Referring to FIG. 9, for example, the third physical programming unit includes the third data bit area DBA3 having the size of 4096 bytes and the third spare bit area SBA3. The third data bit area DBA3 is stored third data D3, and the size of the third data D3 is 4096 bytes.

When receiving a forth write command and the forth data D4 corresponding to the forth write command and having the size of 4096 bytes, because the third physical programming unit does not have any storage space, the memory control circuit unit 104 (or the memory management circuit 202) may identify a forth physical programming unit among the plurality of physical programming units of the rewritable non-volatile memory module 106, and plan to program the forth data D4 into the forth physical programming unit.

Particularly, the memory control circuit unit 104 (or the memory management circuit 202) may first identify the start physical address of the available space of the forth data bit area DBA4 of the forth physical programming unit, which is selected to store the forth data D4 (hereinafter, refers to the forth available space start address Addr_A4). And then, the memory control circuit unit 104 (or the memory management circuit 202) may determine whether the forth data D4 is compressible. If the memory control circuit unit 104 (or the memory management circuit 202) determines that the forth data D4 is incompressible, the memory control circuit unit 104 (or the memory management circuit 202) may store the forth data D4 with the aligning mode. And, the memory control circuit unit 104 (or the memory management circuit 202) may determine whether the forth available space start address (also referred to the first address) Addr_A4 is an integer multiple of the error checking and correcting frame length, namely, determine whether the forth available space start address Addr_A4 is meeting the requirement of start address. The "available space start address" means the address from which the available space in a physical programming unit starts, and the forth available space start address Addr_A4 means the address from which the available space in forth physical programming unit starts (as illustrated in FIG. 9). In FIG. 9, the forth available space start address Addr_A4 is equal to the forth start physical address Addr_S4.

In the foregoing example, because the forth available space start address Addr_A4 is the start physical address of the forth physical programming unit, and the value of the forth available space start address Addr_A4 is 12288 (namely, the value is three times of the error checking and correcting frame length), the memory control circuit unit 104 (or the memory management circuit 202) may plan to store the forth data D4 starting from the forth available space start address Addr_A4.

It should be mentioned, in the present exemplary embodiment, the memory control circuit unit 104 (or the memory management circuit 202) may deter line whether the amount of padding data of a physical erasing unit is larger than a predetermined padding data threshold. If the amount of padding data of a physical erasing unit is larger than the predetermined padding data threshold, the memory control circuit unit 104 (or the memory management circuit 202) may perform a garbage collection operation to the physical erasing unit.

Figure 10:
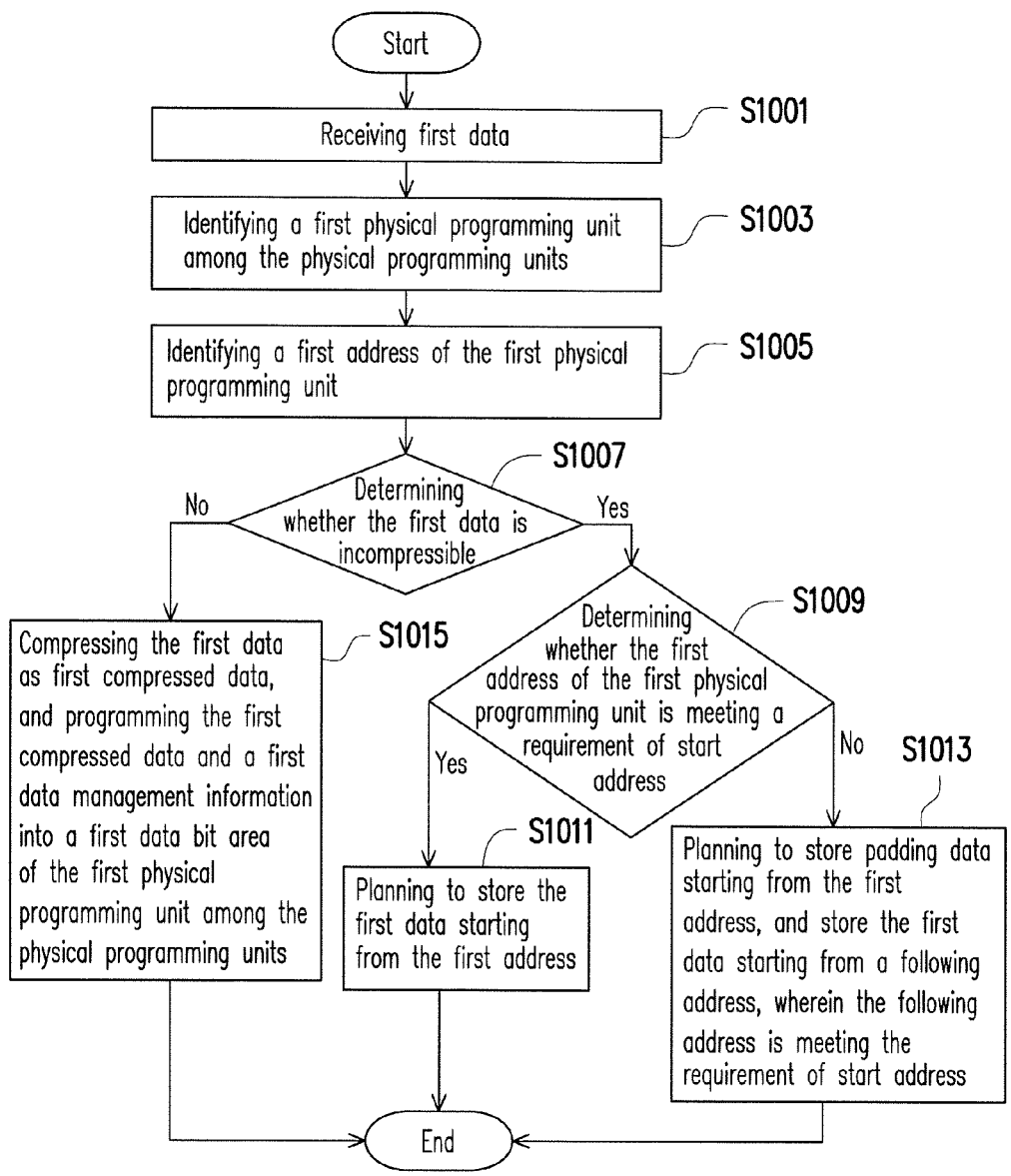
FIG. 10 is a flowchart of the data management method according to the exemplary embodiment.

FIG. 10 is a flowchart of the data management method according to the exemplary embodiment.

Referring to FIG. 10, in the step S1001, the memory control circuit unit 104 (or the memory management circuit 202) may receive first data, and then in the step S1003, the memory control circuit unit 104 (or the memory management circuit 202) may identify a first physical programming unit among the physical programming units. And then, in the step S1005, the memory control circuit unit 104 (or the memory management circuit 202) may first identify a first address of the first physical programming unit, and in the step S1007, the memory control circuit unit 104 (or the memory management circuit 202) may determine whether the first data is incompressible.

According to the result of the determination of the step S1007, if the first data is incompressible, in the step S1009, the memory control circuit unit 104 (or the memory management circuit 202) may determine whether the first address of the first physical programming unit is meeting a requirement of start address.

And, according to the result of the determination of the step S1009, if the first address of the first physical programming unit is meeting a requirement of start address, in the Step S1011, the memory control circuit unit 104 (or the memory management circuit 202) may plan to store the first data starting from the first address, and the flow of the all data management method is end.

If the first address of the first physical programming unit is not meeting a requirement of start address, in the Step S1013, the memory control circuit unit 104 (or the memory management circuit 202) may plan to store padding data starting from the first address, and store the first data starting from a following address, wherein the following address is meeting the requirement of start address.

Further, according to the result of the determination of the step S1007, if the first data is compressible, in the step S1015, the memory control circuit unit 104 (or the memory management circuit 202) may compress the first data as first compressed data, and program the first compressed data and a first data management information into a first data bit area of the first physical programming unit among the physical programming units, and the flow of the all data management method is end.

Accordingly, the present invention may store the incompressible data in way of being aligned with the data bit area of the physical programming unit such that it may prevent from read more physical programming unit. That is, the present invention may store the incompressible data in way of being aligned with the physical programming unit, for example, the incompressible data of which the size is not larger than the size of one physical programming unit will only be stored in one physical programming unit, wherein the incompressible data will be stored starting from the start address of a programming unit, according to the present invention. Therefore, when reading the incompressible data, there is no need to read redundant physical programming unit(s), and the reading efficiency of the memory storage apparatus will be increased. The previously described exemplary embodiments of the present invention have the advantages aforementioned, wherein the advantages aforementioned not required in all versions of the invention.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A data management method for a rewritable non-volatile memory module, wherein the rewritable non-volatile memory module comprises a plurality of physical erasing units and a plurality of logical units for mapping to at least a part of the plurality of physical erasing units, and each of the physical erasing units has a plurality of physical programming units, wherein each of the physical programming units at least stores an error checking and correcting frame, the data management method comprising:

receiving first data;

identifying a first physical programming unit among the plurality of physical programming units;

identifying a first address of the first physical programming unit;

if the first data is incompressible and the first address of the first physical programming unit is meeting a requirement of start address, storing the first data starting from the first address; and if the first data is incompressible and the first address of the first physical programming unit is not meeting the requirement of start address, storing padding data starting from the first address, and storing the first data starting from a following address, wherein the following address is meeting the requirement of start address.

2. The data management method according to claim 1, wherein the following address is a start physical address of a second physical programming unit among the plurality of physical programming units.

3. The data management method according to claim 1, further comprising:

determining whether the first address of the first physical programming unit is an integer multiple of an error checking and correcting frame length; and if the first address of the first physical programming unit is the integer multiple of the error checking and correcting frame length, determining that the first address of the first physical programming unit is meeting the requirement of start address, wherein the following address is the integer multiple of the error checking and correcting frame length.

4. The data management method according to claim 1, further comprising:
    determining whether the first address of the first physical programming unit is a sum of a multiple of an error checking and correcting frame length and a fixed value; and
    if the first address of the first physical programming unit is the sum of the multiple of the error checking and correcting frame length and the fixed value, determining that the first address of the first physical programming unit is meeting the requirement of start address,
    wherein the following address is the sum of the multiple of the error checking and correcting frame length and the fixed value.

5. The data management method according to claim 1, wherein the step of storing padding data starting from the first address comprises:
    storing a valid data smaller than an available space into the available space, and using the padding data to fill the available space,
    wherein the available space is between the first address and the following address.

6. The data management method according to claim 1, wherein the step of storing padding data starting from the first address and storing the first data starting from a following address if the first data is incompressible and the first address of the first physical programming unit is not meeting the requirement of start address comprises:
    if the first data is incompressible and the first address of the first physical programming unit is not meeting the requirement of start address, determining whether the size of the first data is larger than a predetermined value; and
    if the size of the first data is larger than the predetermined value, storing the padding data starting from the first address, and storing the first data starting from the following address, wherein the following address is meeting the requirement of start address.

7. The data management method according to claim 1, wherein the step of storing padding data starting from the first address and storing the first data starting from a following address if the first data is incompressible and the first address of the first physical programming unit is not meeting the requirement of start address comprises:
    if the first data is incompressible, the first address of the first physical unit is not meeting the requirement of start address and the quantity of incompressible data to be stored after the first data is larger than a predetermined quantity, storing the padding data starting from the first address, and storing the first data starting from the following address, wherein the following address is meeting the requirement of start address.

8. The data management method according to claim 1, further comprising:
    if the amount of padding data of the first physical erasing unit among the plurality of physical erasing units is larger than a predetermined padding data threshold, performing a garbage collection operation to the first physical erasing unit.

9. A memory control circuit unit for controlling a rewritable non-volatile memory module, the memory control circuit unit comprising:
    a host interface coupled to a host system;
    a memory interface coupled to the rewritable non-volatile memory module, wherein the rewritable non-volatile memory module comprises a plurality of physical erasing units and a plurality of logical units for mapping to at least a part of the plurality of physical erasing units, wherein each of the physical erasing units has a plurality of physical programming units, wherein each of the physical programming units at least stores an error checking and correcting frame;
    a memory management circuit coupled to the host interface and the memory interface, wherein the memory management circuit is configured to configure the plurality of logical units for mapping to at least the part of the plurality of physical erasing units,
    wherein the memory management circuit is further configured to receive first data,
    wherein the memory management circuit is further configured to identify a first physical programming unit among the plurality of physical programming units,
    wherein the memory management circuit is further configured to identify a first address of the first physical programming unit,
    wherein if the first data is incompressible and the first address of the first physical programming unit is meeting a requirement of start address, the memory management circuit stores the first data starting from the first address,
    wherein if the first data is incompressible and the first address of the first physical programming unit is not meeting a requirement of start address, the memory management circuit stores padding data starting from the first address, and stores the first data starting from a following address, wherein the following address is meeting the requirement of start address.

10. The memory control circuit unit according to claim 9, wherein the following address is a start physical address of a second physical programming unit among the plurality of physical programming units.

11. The memory control circuit unit according to claim 9, further comprising:
    the memory management circuit determines whether the available space start address of the first physical programming unit is an integer multiple of an error checking and correcting frame length; and
    if the first address of the first physical programming unit is the integer multiple of the error checking and correcting frame length, the memory management circuit determines that the first address of the first physical programming unit is meeting the requirement of start address,
    wherein the following address is the integer multiple of the error checking and correcting frame length.

12. The memory control circuit unit according to claim 9, further comprising:
    the memory management circuit determines whether the available space start address of the first physical programming unit is a sum of a multiple of an error checking and correcting frame length and a fixed value; and,
    if the first address of the first physical programming unit is the sum of the multiple of the error checking and correcting frame length and the fixed value, the memory management circuit determines that the first address of the first physical programming unit is meeting the requirement of start address,
    wherein the following address is the sum of the multiple of the error checking and correcting frame length and the fixed value.

13. The memory control circuit unit according to claim 9, wherein in the operation of storing padding data starting from the first address, the memory management circuit stores a valid data smaller than an available space into the available space, and uses the padding data to fill the available space, wherein the available space is between the first address and the following address.

14. The memory control circuit unit according to claim 9, wherein in the operation of the memory management circuit stores the padding data starting from the first address and stores the first data starting from the following address if the first data is incompressible and the first address of the first physical programming unit is not meeting the requirement of start address, if the first data is incompressible and the first address of the first physical programming unit is not meeting the requirement of start address, the memory management circuit determines whether the size of the first data is larger than a predetermined value, wherein if the size of the first data is larger than the predetermined value, the memory management circuit stores the padding data starting from the first address, and stores the first data starting from the following address, wherein the following address is meeting the requirement of start address.

15. The memory control circuit unit according to claim 9, wherein in the operation of the memory management circuit stores the padding data starting from the first address, and stores the first data starting from the following address if the first data is incompressible and the first address of the first physical programming unit is not meeting the requirement of start address, if the first data is incompressible and the first address of the first physical unit is not meeting the requirement of start address, the memory management circuit determines whether the quantity of incompressible data planned to be stored after the first data is larger than a predetermined quantity, wherein if the quantity of incompressible data to be stored after the first data is larger than the predetermined quantity, the memory management circuit stores the padding data starting from the first address, and stores the first data starting from the following address, wherein the following address is meeting the requirement of start address.

16. The memory control circuit unit according to claim 9, further comprising:

if the amount of padding data of the first physical erasing unit among the plurality of physical erasing units is larger than a predetermined padding data threshold, the memory management circuit is further configured to perform a garbage collection operation to the first physical erasing unit.

17. A memory storage apparatus, comprising:

a connection interface unit coupled to a host system;

a rewritable non-volatile memory module, wherein the rewritable non-volatile memory module has a plurality of physical erasing units and a plurality of logical units for mapping to at least a part of the plurality of physical erasing units, each of the physical erasing units has a plurality of physical programming units, and each of the physical programming units at least stores an error checking and correcting frame; and a memory control circuit unit coupled to the connection interface unit and the rewritable non-volatile memory module, wherein the memory control circuit is configured to configure the plurality of logical units for mapping to at least the part of the plurality of physical erasing units, wherein the memory control circuit unit is configured to receive first data, wherein the memory control circuit unit is further configured to identify a first physical programming unit among the plurality of physical programming units, wherein the memory control circuit unit is further configured to identify a first address of the first physical programming unit, wherein if the first data is incompressible and the first address of the first physical programming unit is meeting a requirement of start address, the memory control circuit unit is further configured to store the first data starting from the first address, wherein if the first data is incompressible and the first address of the first physical programming unit is not meeting the requirement of start address, the memory control circuit unit is configured to store padding data starting from the first address, and store the first data starting from a following address, wherein the following address is meeting the requirement of start address.

18. The memory storage apparatus according to claim 17, wherein the following address is a start physical address of a second physical programming unit among the plurality of physical programming units.

19. The memory storage apparatus according to claim 17, further comprising:

the memory control circuit unit determines whether the available space start address of the first physical programming unit is an integer multiple of an error checking and correcting frame length; and if the first address of the first physical programming unit is the integer multiple of the error checking and correcting frame length, the memory control circuit unit determines that the first address of the first physical programming unit is meeting the requirement of start address, wherein the following address is the integer multiple of the error checking and correcting frame length.

20. The memory storage apparatus according to claim 17, further comprising:

the memory control circuit unit determines whether the available space start address of the first physical programming unit is a sum of a multiple of an error checking and correcting frame length and a fixed value; and if the first address of the first physical programming unit is the sum of the multiple of the error checking and correcting frame length and the fixed value, the memory control circuit unit determines that the first address of the first physical programming unit is meeting the requirement of start address, wherein the following address is the sum of the multiple of the error checking and correcting frame length and the fixed value.

21. The memory storage apparatus according to claim 17, wherein in the operation of storing the padding data starting from the first address, the memory control circuit unit to stores a valid data smaller than an available space into the available space, and uses the padding data to fill the available space, wherein the available space is between the first address and the following address.

22. The memory storage apparatus according to claim 17, wherein in the operation of the memory control circuit unit stores the padding data starting from the first address, and stores the first data starting from the following address if the first data is incompressible and the first address of the first physical programming unit is not meeting the requirement of start address,
 if the first data is incompressible and the available space start address of the first physical programming unit is not meeting the requirement of start address, the memory control circuit unit determines whether the size of the first data is larger than a predetermined value,
 wherein if, the size of the first data is larger than the predetermined value, the memory control circuit unit stores the padding data starting from the first address, and stores the first data starting from the following address,
 wherein the following address is meeting the requirement of start address.

23. The memory storage apparatus according to claim 17, wherein in the operation of the memory control circuit unit stores the padding data starting from the first address, and stores the first data starting from the following address if the first data is incompressible and the first address of the first physical programming unit is not meeting the requirement of start address,
 if the first data is incompressible and the first address of the first physical unit is not meeting the requirement of start address, the memory control circuit unit determines whether a quantity of incompressible data to be stored after the first data is larger than a predetermined quantity,
 wherein if the quantity of incompressible data to be stored after the first data is larger than the predetermined quantity, the memory control circuit unit stores the padding data starting from the first address, and stores the first data starting from the following address,
 wherein the following address is meeting the requirement of start address.

24. The memory storage apparatus according to claim 17, further comprising:
 if the amount of padding data of the first physical erasing unit among the plurality of physical erasing units is larger than a predetermined padding data threshold, the memory control circuit unit is further configured to perform a garbage collection operation to the first physical erasing unit.

* * * * *